United States Patent [19]

Anderson

[11] Patent Number: 4,883,602
[45] Date of Patent: Nov. 28, 1989

[54] DECANTING APPARATUS AND METHOD

[75] Inventor: Marvin H. Anderson, Denver, Colo.

[73] Assignee: Fluid Dynamics, Inc., Boulder, Colo.

[21] Appl. No.: 235,010

[22] Filed: Aug. 22, 1988

[51] Int. Cl.⁴ .................................... C02F 1/20
[52] U.S. Cl. ........................... 210/776; 210/188;
    210/195.3; 210/220; 210/525; 210/803
[58] Field of Search ................ 210/188, 195.3, 220,
    210/522, 525, 539, 626, 629, 800, 803, 921, 926,
    109, 115, 802, 776; 261/DIG. 75; 73/215;
    239/461

[56] References Cited

U.S. PATENT DOCUMENTS

| | | | |
|---|---|---|---|
| Re. 32,597 | 2/1988 | Pette | 210/188 |
| 4,272,369 | 6/1981 | Love | 210/195.3 |
| 4,391,704 | 7/1983 | Anderson | 210/188 |
| 4,596,658 | 6/1986 | Mandt | 210/629 |
| 4,599,167 | 7/1986 | Benjes et al. | 210/195.3 |
| 4,632,758 | 12/1986 | Whittle | 210/195.3 |
| 4,711,716 | 12/1987 | Calltharp et al. | 210/525 |
| 4,749,480 | 6/1988 | Luhrs et al. | 210/188 |
| 4,765,891 | 8/1988 | Wyness | 210/525 |

Primary Examiner—Richard V. Fisher
Assistant Examiner—Joseph Drodge
Attorney, Agent, or Firm—Notaro & Michalos

[57] ABSTRACT

A solids excluding subsurface fixed liquid decanter is used primarily to decant the settled liquid above the decanter. The decanter has no moving parts and will discharge this liquid at a constant flow rate regardless of the liquid head pressure above the decanter over the time of decant. The decanter is designed to exclude solids and liquid from entering the confines of the device during the fill and mixing cycles of an SBR waste treatment process. During the aeration cycle, air is directed into a bell or hood of the decanter to replace any absorption or leakage in vent piping of the decanter. The decanter also has a mechanism for skimming the surface of the liquid volume for removing floating solids that are undesirable to the process.

20 Claims, 9 Drawing Sheets

DECANTING APPARATUS AND METHOD

BACKGROUND OF THE INVENTION

The invention relates to a fixed elevation subsurface decanting device used primarily for removing a portion of liquid above the apparatus and, more particularly, for removing settled and clarified liquid in the top third of the liquid in a sequencing batch reactor (SBR) waste treatment process.

An EPA report entitled "Technology Evaluation of Sequencing Batch Reactors", by James M. Montgomery, September 1984, discloses various aspects of SBR technology and is incorporated by reference to illustrate the state of the art.

In a conventional continuous flow waste activated treatment, the effluent to the system first enters an aeration tank that contains a mixture of waste to be treated and various forms of bacteria that assimilate and liquify the solids and convert them into a non-polluting liquid. The mixture is aerated by aeration devices, such as jet aerators, and diffusers. Air is absorbed into the liquid as dissolved oxygen and is readily available to the various forms of aerobic bacteria to metabolize the pollutants. A so-called F/M ratio is controlled within a defined range for optimum treatment efficiency. "F" represents the influent food and "M" the mixed liquid suspended solids (MLSS). As liquid and solid pollutants enter the aeration tank, an equal volume of liquid and MLSS is displaced from the tank. This volume of liquid is transferred by gravity to a clarifier where the solids settle and the clarified liquid is decanted over a weir. The settled solids (sludge) are pumped from the clarifier back to the aeration tank. A portion of the sludge is discharged to waste in order to maintain the proper F/M ratio in the aeration tank.

State and federal authorities have recognized that the velocity near the overflow weir in a clarifier must be kept low in order to prevent the formation of eddy currents, in this area, that would impede the settling of the solids in the clarifier. Most States adhere to the recommendations of the so-called "Ten States Standards" for the clarifier design and the overflow rate of the weirs within the clarifier. This standard recommends that the weir length be equal to 20,000 gallons per day (gpd) per foot of weir at the peak hourly flow rate. Since the peak hourly flow rate can be two to three times the average, a one million gallon per day (mgd) plant can have an hourly peak of three million gallons per day (mgd). Therefore, the required weir length is determined by dividing 3 mgd by 20,000 gpd. In such case, 150 foot of weir is needed and provides a capacity of approximately 14 gpm per foot of weir.

In surveying many sequencing batch reactor installations, it was discovered that the main reason for failure to meet expected discharge quality can often be traced to the design of the decanting device. For a 1 mgd SBR plant, the total length of weir usually is less than 25 feet per tank. Since each tank decants a maximum of six times a day and generally for 45 minutes per decant, the flow rate required to handle 1 mgd is 74 gpm per foot of weir. This is over five times the recommended maximum overflow from a clarifier. Unless a pumped decanter or a flow regulating valve is used on the discharge from the decanter, the actual flow can be three times higher than this rate due to the fact that all decanters used today have an outlet below the low water line and the flow from the decanter is usually a function of the varying hydraulic head between the high and low water lines in the aeration tank.

U.S. Pat. No. 4,596,658 refers to a design flow of up to 300 gpm per foot of weir. This is more than 20 times the established recommended standard for overflow rates of clarifier weirs, as defined by the "Ten States Standards". It is recognized that since an SBR also functions as a clarifier with a settle cycle prior to decanting, the decanter or overflow weir should be designed to recognized good engineering practices. After settling the contents in the tank, an interface exists between the clarified liquid at the top of the tank and the MLSS nearer the bottom of the tank. The depth of the MLSS is a function of the settleability and the quantity of solids in the MLSS content. Although in a well operated plant, this settled sludge should occupy only 50 to 60% of the tank volume, it is not unusual to have the interface occurring 3 to 4 feet from the top of the tank. Whether using a floating type of decanter or fixed elevation decanter, the interface can be in close proximity to the decanter at some time during the decant cycle.

It became apparent to the inventor that a decanting device should be designed so that it would come close to the recommended maximum flow rate per foot of weir length, so that it can be fixed or floating with no moving parts within the tank, so that it excluded solids when the tank was filling or being mixed and aerated, and so that it had a constant discharge rate without expensive flow control devices. The approach velocity into the decanter should be between 0.125 and 0.25 fps.

Various decanter features are disclosed in the patent literature. For example, a surface decanter is disclosed in U.S. Pat. No. 4,290,887 which has a moving header pipe with weir slots having V-notches cut in trailing edges of the slots. A liquid separator is disclosed in U.S. Pat. No. 4,396,508 which includes inclined separator baffles that help facilitate separation of different phases in the liquid. A floating decanter apparatus is disclosed in U.S. Pat. No. 4,711,716 while a strainer device with a rotating body is disclosed in U.S. Pat. No. 4,024,062. None of these patents disclose a combination of features which would have all the advantages and requirements noted above.

SUMMARY OF THE INVENTION

The present invention is directed to a SBR decanter that includes a unique gravity influent trough and overflow weir arrangement.

In accordance with the invention, a diving bell type hood is utilized to form an air lock over the trough in an aeration tank and provide a liquid trap that prevents the escape of pressurized air from the hood when the decant valve is open.

The inventive arrangement also includes means for discharging floating scum from the tank waste during the fill cycle.

The invention advantageously utilizes a unique air charging and venting system which limits the entry of solids and liquid into the decanter hood and which controls the level of the liquid passing over the weir, thereby maintaining a constant flow rate from the decanter independent of the liquid height over the decanter in the tank.

In accordance with a preferred embodiment of the invention, a deflector at the liquid entrance of the decanter that directs the liquid flow from the tank into a space between the trough and the deflector along a horizontal axis of the decanter, or at an upward angle to the horizontal, at a low approach velocity of approximately 0.125 to 0.25 fps. These features advantageously prevents settled solids from being drawn upwardly into the decanter even when the sludge-liquid interface is at the bottom of the decanter.

In a preferred embodiment of the invention, a double sided weir is provided so that the effective weir length is double the actual decanter length. Solids that may collect between the deflector and the trough settle out and are segregated from the low velocity flow into the decanter from the tank. The shape of the weir and trough assembly is designed to allow air to escape from the bottom of the trough and rise into the hood to replace any air that might have accidentally escaped by leakage or absorption. Excess air will rise to the surface of the tank during the aeration cycle.

A vent line from the top of the decanter terminates in a secondary vent leg that extends into the liquid level of the tank. The end of this vent leg is at the exact height of the overflow level needed to obtain the desired flow rate over the weir in the decanter. The height of the vent leg can be raised or lowered to increase or decrease the flow over the weir. As the head pressure of the liquid decreases due to the lowering of the tank water level, the pressure in the air trap hood is allowed to equalize with the tank level and keep the level over the weir constant. When the tank level reaches the lower end of the vent leg, the pressure in the hood is at atmospheric pressure and equal to the pressure on the tank volume. A pressure switch in the vent line, or a float switch in the tank, will terminate the decant cycle. The effluent valve then closes as does a vent solenoid valve in the vent line.

An air supply solenoid valve will then open and pressurize the decanter hood. This will expel the water in the hood and prevent solids and liquids from entering the decanter interior until the next decant cycle is started. A level probe in the vent line detects the liquid level in the decanter hood and closes the air supply solenoid valve when the liquid level is at the decanter hood lip.

The double sided weir allows the decanter to be placed within the center of the tank, and provides the recommended linear length in one-half the space. It would be much more difficult and expensive if a single-sided weir is used. It would require that the weir be placed along the side walls for almost the entire length of the tankage.

Accordingly, an object of the present invention is to provide a decanter device or apparatus which has no moving parts but which effectively and efficiently decants liquids from a tank which receives liquids and solids, while at the same time, removing scum from the surface of the liquid in the tank.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DETAILED DESCRIPTION

Figure 1:
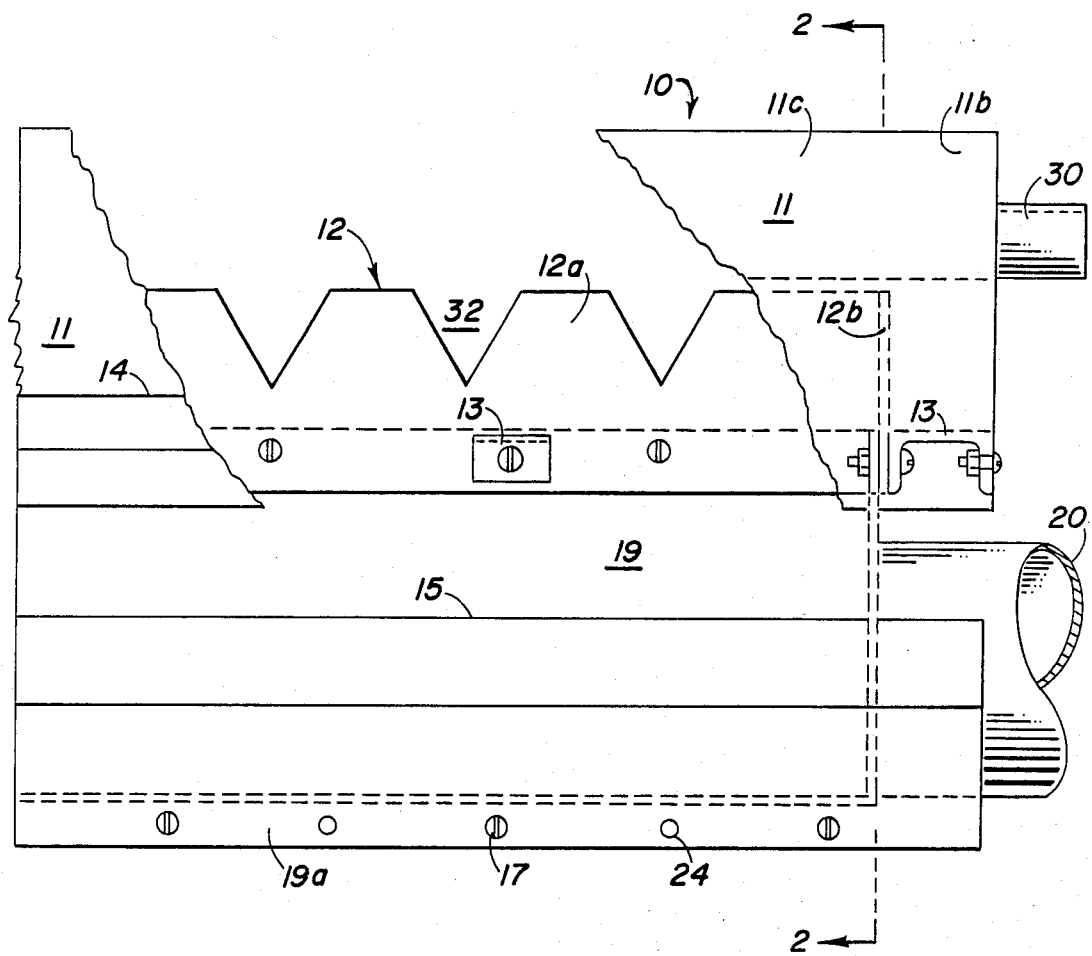
FIG. 1 is a side elevational view of a section of the decanter inventive apparatus with a portion of the air lock hood, partly broken away, to show details of the overflow weir.
Figure 2:
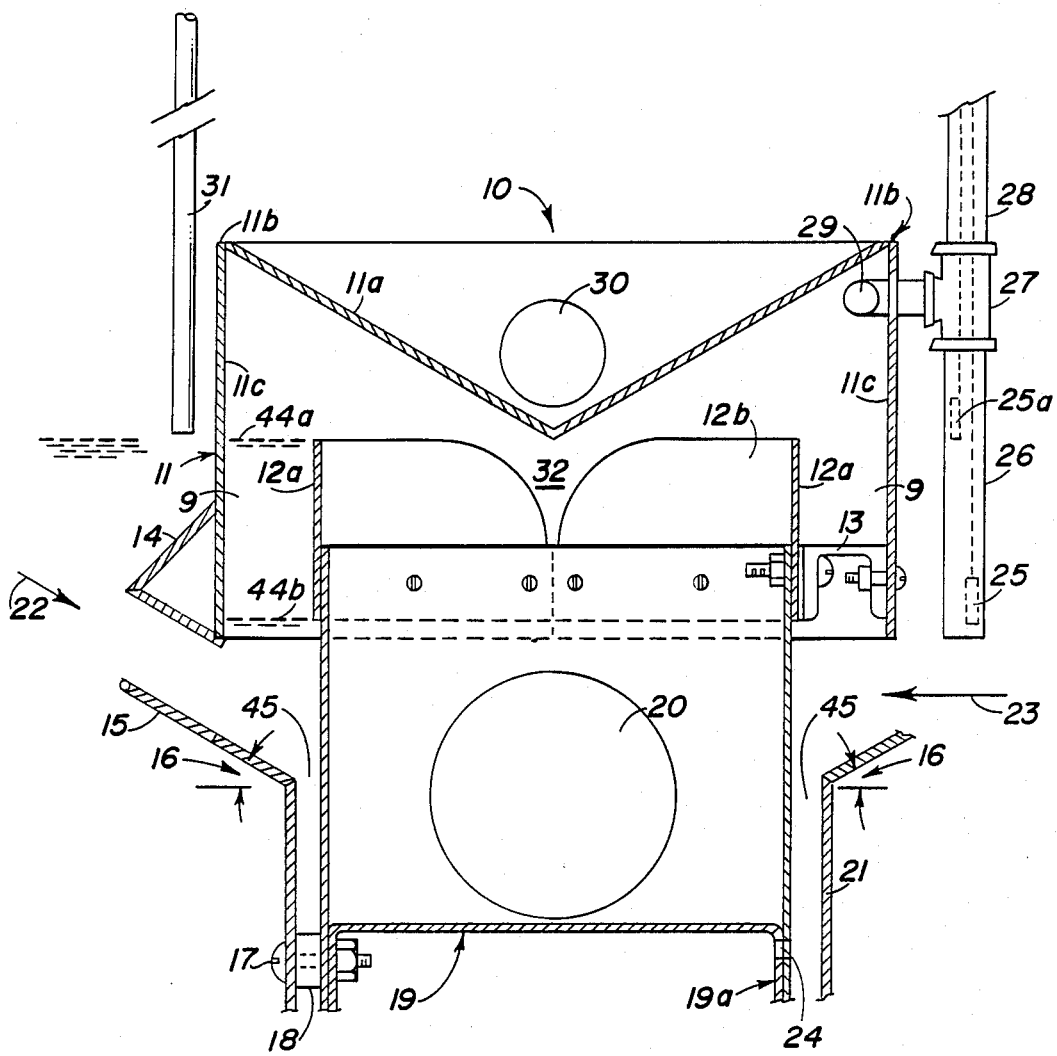
FIG. 2 is a transverse section of the decanter taken along the line 2—2 of FIG. 1.

Referring to FIG. 1, a decanter 10 includes a generally open-topped rectangular collection trough 19 and an air lock hood 11 which is mounted over the open top of the trough 19. A weir 12, composed of a plurality of weir plates 12a, 12b, is connected along the top end of trough 19. The hood 11 is composed of a ceiling 11a which is continuously interconnected with side walls 11c along an upper edge 11b of the side walls 11c. As shown in FIG. 2, the ceiling 11a is a V-shaped plate. Other concave shapes, or convex shaped plates connected to the sidewalls below edges 11b, may be utilized. The weir plates 12a, 12b are held in place and the hood 11 is fixed in position and secured relative to the trough 19 at a spaced interval 9 around the weir 12 and the upper periphery of the trough 19 by a plurality of spacers 13. As shown in the embodiments of FIGS. 1 and 2, each of the spacers 13 comprise a U-shaped member with a first leg bolted or welded to the side wall 11c of the hood and a second leg bolted to a weir plate 12a, 12b and the trough 19. For clarity only, one spacer 13 is shown between weir 12 and hood 11 in FIG. 2. The quantity and spacing of spacers 13 will be determined by the size of the decanter hood, the material used to fabricate the decanter, and the uplift forces to which the hood 11 is subjected. The uplift force depends on the volume of air entrapped in the hood and is greatest when the liquid level is at low water level 44b. Each weir plate 12a, 12b has one or more openings 32, preferably, a series of V-notch openings. The rate of flow over this type of opening, as is well known, varies with the 2.5 power of the height of liquid over the apex of the V-notch.

An effluent outlet pipe 20 is connected to the lower end of an end wall of trough 19. The effluent outlet pipe 20 is sized, when full of liquid, to handle by gravity the maximum flow rate of the decanter.

A scum outlet 30 is connected to a side wall 11c of hood 11. Outlet 30 is used to discharge scum and liquid which accumulate on the top of the ceiling 11a of the hood 11. It is important that upper and outer edges 11b of hood 11 be level in both horizontal directions. This will allow any scum to be removed evenly over the entire length of this weir edge which is at a first level. The height of the liquid during the scum removal process will be ⅛ to ¼ above weir edge 11b.

Flow deflectors 15, 21 are secured to the lower end of trough 19 via spacers 18 (see FIG. 2). The spacers 18 provide a longitudinal space between the trough 19 and the deflector plate 15, 21.

Two different deflectors 15 and 21 are illustrated in FIG. 2. Both deflectors 15, 21 are bent at an angle 16 ranging from 45° to 60° from the horizontal. Deflector 15 extends upwardly beyond the bottom edge of hood 11. A triangular shaped angle plate 14 is located at the bottom edge of hood 11 and extends to a second level below the first level of the weir. In this arrangement, fluid flows in the direction of 10 and is directed downwardly from the horizontal direction. This arrangement is recommended for SBR systems that have less than 12 to 14 feet of liquid depth below the low water line in the tankage. The triangular shaped angle plate 14 stiffens the side edge of the hood 11 and permits a lighter gage metal or fiberglass material to be used. This reduces the cost of the hood assembly. The deflector shown at 21 has a top angular extension terminating in an edge that is vertically aligned with and spaced below the side wall of hood 11. This arrangement allows fluid to horizontally flow in the direction of arrow 23 into the decanter. In both arrangements, the deflectors 15, 21 terminate at the vertical outer edge or effective outer edge of the hood 11 or the hood with angle plate 14. During the settling cycle of the SBR process, the MLSS above the decanter cannot thus enter a space 45 between the deflector and trough. The only solids that can settle in this area are those that are present in this space. Those solids are allowed to settle and drop through the longitudinal space 45 which is maintained at ¼ to ½ by the spacer washers 18. Bolts 17 secure the deflectors 15, 21 to a bottom flange 19a of trough 19. The securing bolts 17 do not penetrate the interior of the trough 19 and, therefore, the trough remains water and air tight. The bottom edge of trough flange 19a extends below the floor of the through. The flange 19a of the trough 19 contains a series of holes 24 on approximately 2" to 3" centers. A number of these holes are used for the fasteners 17 and spacers 18. The remainder of the holes 24 allow trapped air or gas under the trough 19 and confined by the bottom flanges to escape up between the trough 19 and the deflectors 15, 21 and into the space 45. This air will recharge the hood 11 if there is a leakage of air or absorption of air into the liquid.

Figure 3:
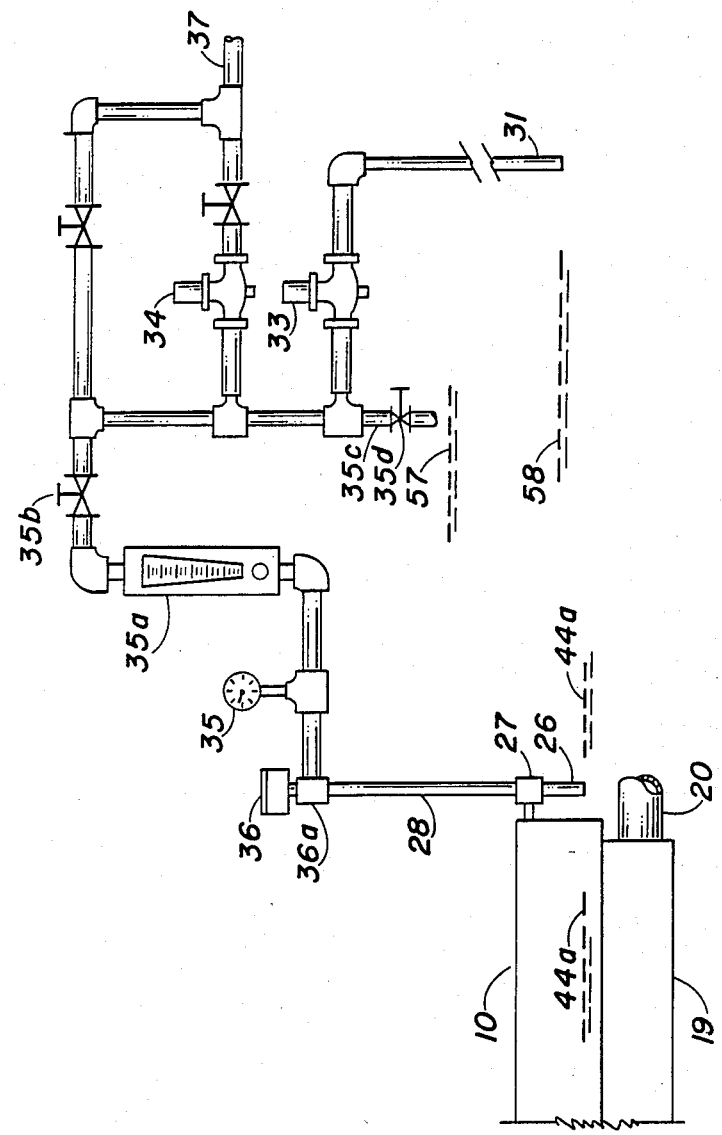
FIG. 3 is a schematic representation of the decanter vent control system.

FIG. 2 also shows the relative location of water level 44a in space 9. The water level 44a represents the normal water level during a decant cycle and is determined by the depth of the equalizing vent 31. The low water level 44b is the normal water line whenever the decanter is not in operation. This level is maintained by probe 25 and an associated air solenoid valve 34 (FIG. 3). Air flows through line 37 into the hood 11 via valve 34. During the aeration cycle, the air trapped below the trough is vented through the vent holes 24 into the hood 11.

FIG. 3 shows schematically the vent system used to maintain a constant flow from the decanter 10 regardless of the height of the tank liquid. As shown in FIG. 2, an air vent pipe 28 is connected with the interior of the hood 11, near the top of the hood, via a vent outlet 29 which communicates with the interior space immediately below the ceiling 11a. Vent outlet 29 is connected through a tee 27 to the vertical air vent pipe 28. The vent pipe 28 extends upwardly to a height above a high water level 57 of the tank and preferably above the tank wall 41 (shown in FIGS. 4 and 6), so that the components of the vent system can by easily maintained and serviced. The probe 25, a conductance probe, is used in the control of the air volume in the hood 11, as discussed below, is provided in a downcomer 26 connected to the branch of tee 27 opposite pipe 28. The downcomer 26 extends to the level of the lower lip of hood 11. A probe holder 36 for the probe 25 is mounted at the highest extremity of the vent pipe 28. A tee 36a connects to pressure sensing means, either a pressure gage or a pressure switch 35, or both. A rotometer 35a with a needle type flow control valve can be used so that the exit of air when a solenoid valve 33 is opened, can be controlled to remain at a low rate. This will prevent a rush of water into the hood 11 when a decant cycle is started. The rotometer 35a also gives the operator a method of determining if the decanter 10 is functioning properly. The flow through this meter should remain constant until the end of the decant cycle.

A vent pipe 31, in communication with vent 28, as is best shown in FIG. 3, has an end placed at a depth that is equal to the height of the desired water level 44a at the weir 12. This height will determine flow rate during discharge and will be set to provide approximately 14 gpm per foot of weir length.

The air vent pipe 28 is connected to a pair of solenoid valves 33, 34 via rotometer 35. Solenoid valve 34 is connected to a positive source of air pressure (not shown) via line 37. In most applications, the air pressure needs to be only at least 2 psi more than the pressure difference between the low and high water levels in the treatment tankage. An aeration blower, which typically operates at above 5 psi, can provide an air pressure source. A compression tank may be used so that a source of 5 psi air is available in the event the blower system is not operating at the time that air from 37 is required. The air supply source is preferably separate from the aeration blowers. The air supply can also be used to activate the various valves associated with the treatment system such as influent valves 44 (FIG. 5), effluent outlet valves 43 and scum valves 47. Although the solenoid valves 34 would normally be electrically operated, the use of pneumatically-operated cylinder-actuated ball valves would be more dependable. If solenoid valves are used, valve 33 will preferably be in parallel with a second valve (not shown). Since solenoid valves normally close on failure, the system cannot decant if a failure occurs in a single valve. A bypass should also be provided around these valves 34 and 33 so the system can be operated manually if required. A valve 35b should be provided which is normally open. By closing valve 35b, the decanting system can be left in operation while doing service on the vent system.

In operation, the tank draw down distance, shown as water level 58 in FIG. 3, can vary from a few inches to a few feet. The decanting cycle is started through a high level float switch (not shown) in the tank. The decanting cycle will not start until a preselected time interval has passed in order to allow the contents within the tank to settle. The pressure gage shown as 35 in FIG. 3 can also be used by the operator to determine if the system is operating properly. This gage should read 0-5 feet of pressure and will gradually diminish as the level in the tank recedes. A drip leg 35c is provided in a downcomer pipe in the vent line and terminates with a manual valve 35d. This allows moist air to condense and be trapped in this leg 35c. By closing manual valve 35b and opening manual valve 35d, the operator can purge this liquid. It is important to keep liquid out of the solenoid valves 33, 34 as the liquid can contain hydrogen sulfide which will form sulfuric acid when condensed with water. The service life of the valves will be extended if this liquid is purged at frequent intervals, especially if the air temperature above the liquid is substantially below the temperature of the waste in the treatment tankage.

After the aeration and mixing cycle, the MLSS directly above the decanter is allowed to settle into a scum collector trough above the hood. When the scum effluent valve is opened, this amount of sludge will flow out before the scum is allowed to overflow the straight edge weir of the scum trough. The MLSS will only represent approximately 5 to 10% of the sludge that should be discharged to waste after each decant cycle, but on a plant that is underloaded, this can be adequate to keep the F/M ratio in balance. During a normal decant cycle, the top 3 feet or more of liquid is decanted. Since the liquid must flow to the decanter through linear orifices, the scum that is floating is pulled near the decanter. During the scum removal process, the scum is relatively close to the decanter and only a small volume of liquid need be decanted to remove the undesirable scum from the surface of the tank. The scum decanter or skimmer is controlled from a float switch or other liquid level device (not shown) and opens when the level is approximately ⅛ to ¼ above the crest of the weir during the fill cycle. If the quantity of liquid going over the weir is approximately equal to the influent into the tank, the level will remain relatively constant and the time the scum valve is opened can be extended to pull more scum with a relatively low volume of liquid. The scum and liquid is usually allowed to flow to a digester, along with wasted MLSS. Wasting of excess MLSS solid is usually done some time during the fill cycle after the decant so the concentration is as high as possible due to a long settling time.

If solids are wasted in conjunction with the operation of the skimmer, the level over the skimmer can be more closely regulated and balanced to be equal to the influent to the tank. Spray headers to direct the scum toward the skimmer can also be incorporated where large volumes of scum are anticipated. The location of the decanter should be near the center of the tank since it decants from both sides. On large tanks more than one decanter may be used. They should be parallel to each other and have approximately equal distance between themselves and the side walls of their tankage. A liquid trap is also provided in the effluent pipe from each decanter which must be vented to the atmosphere. This will prevent the liquid trap from becoming a siphon which would disturb the hydraulic balance in the decanter and result in a non-uniform flow rate over the total decant period.

Figure 4:
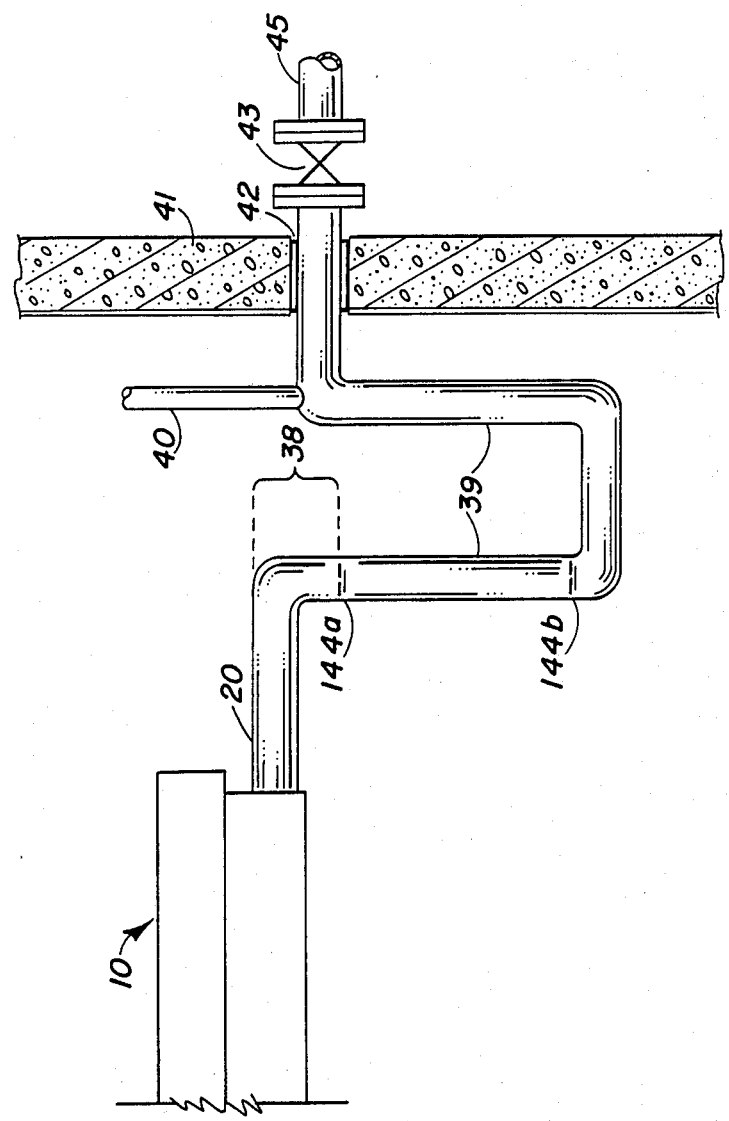
FIG. 4 is a side elevational view of a section of the effluent end of the decanter which illustrates the liquid trap, vent and effluent valve.

In FIG. 4, decanter 10 is shown mounted in the treatment tankage without the necessary support system. The effluent outlet pipe 20 is connected to a liquid trap 39. The trap is vented by a vent pipe 40. The outlet valve 43 when used is mounted outside of tankage wall 41. However, valve 43 can be mounted within the tankage if more convenient, and can have an extended operator handle above the high water line. A water tight seal 42 is provided in the wall 41 where the effluent pipe 20 passes through wall 41. The pipe 20 is sized to handle the maximum flow from the decanter 10 by gravity with a head pressure that does not exceed level difference 38 as shown in FIG. 4. The level in this liquid trap 39 will be at 144a at the end of a decant cycle. At the beginning of a decant cycle with the tank water at its highest point, the level will drop to 144b when used without valve 43. When the effluent outlet valve 43 is opened and the level in the tank recedes, the distance between 144a and 144b will be diminished. The distance between 144a and 144b must be greater than the distance between levels 57 and 58 (FIG. 6) which represents the high and low water levels in the treatment system. The vent pipe 40 extends above the high water level to atmosphere and prevents the liquid trap from becoming a siphon which would be detrimental to the operation of the decanter apparatus.

Figure 5:
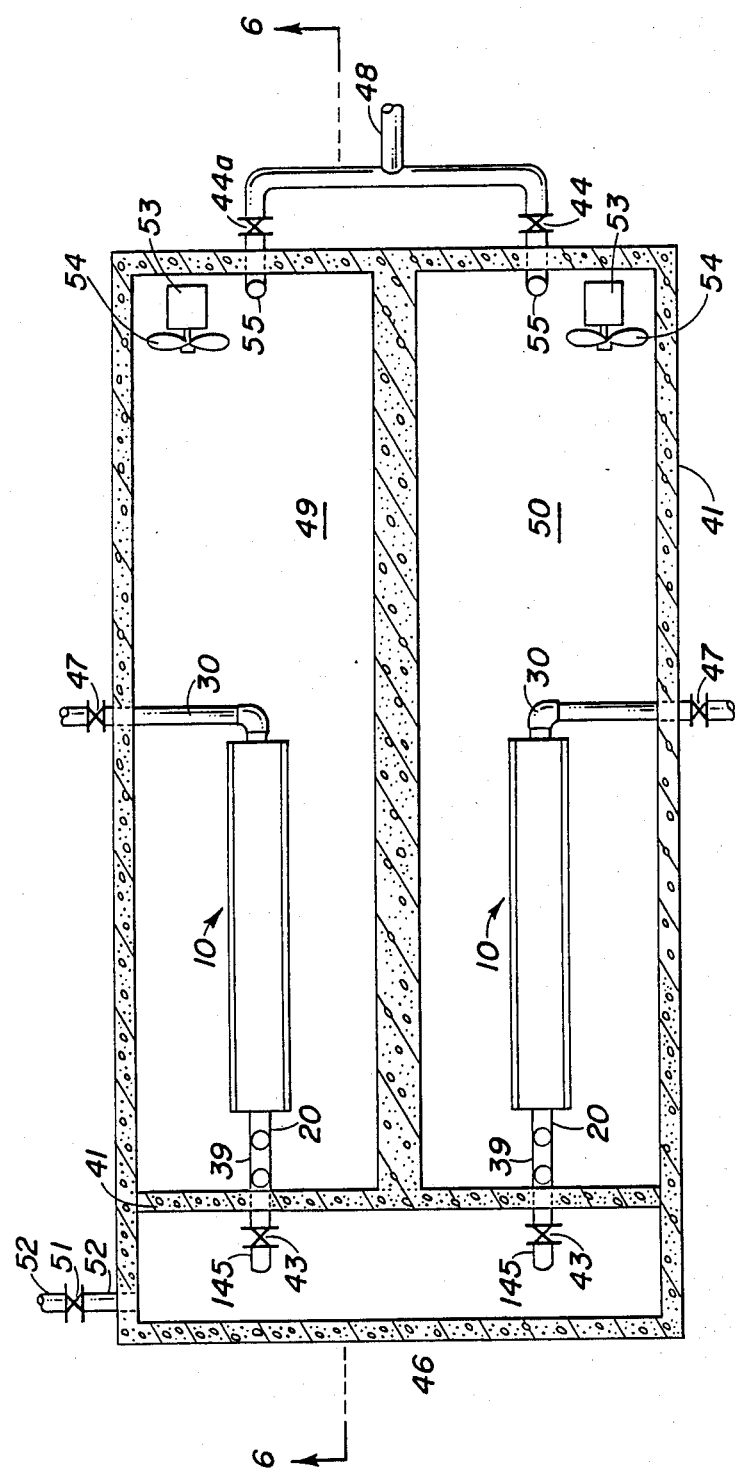
FIG. 5 is a top plan view of a typical sequencing batch reactor waste treatment tank with decanters of the invention mounted therein.

The plan view of FIG. 5 illustrates a typical two tank sequencing batch reactor waste treatment process. It shows the typical location of the decanter apparatus 10, in relation to the side walls of 41 of the tanks 49 and 50. It also illustrates the scum outlet pipes 30 and the corresponding valves 47. The effluent discharge from the decanter 10 is shown as 20 through liquid trap 39, penetrating tank wall 41 and entering tank 46 through effluent valve 43. Tank 46 represents a disinfection holding tank such as a chlorine contact tank. A valve 51 can be opened after a predetermined time interval that allows the chlorine germicide to fully react with the contents within this tank. Normal practice is to have a contact time of 30 minutes. Since the flow into this tank through outlet 145 is constant, the disinfection agent can be metered at a constant volume over the length of the decant cycle. This very much simplifies the disinfection system. On a continuous flow waste treatment system, the disinfecting agent must be metered at a rate that is proportional to the flow.

The size of tank 46 must be greater in volume than the total volume of the decant. The volume must be contained in the space below the influent pipe 145 to the tank so that the liquid from the decanter will flow by gravity. If gravity flow out of tank 46 is not possible, then its contents must be pumped. Since the minimum time between using decanting tank 49 and 50 is two hours, the tank 46 must be emptied before a second decanting cycle can be started. These timing functions are usually controlled by process controllers, as are known in the art, such as that manufactured by Texas Instruments, or a variety of time clocks that are adjustable by the operator.

FIG. 5 also shows the influent pipe 48 which splits into either tank 49 through a first valve 44, or tank 50 through another valve 44. When one of these valves is open, the other valve is closed.

FIG. 5 also shows a submerged motor 53 and mixer blade 54 mounted in the influent end of tanks 49 and 50. These mixers may not be required if the mixing intensity level provide by an aeration device (not shown) is adequate to re-suspend the settled MLSS. These mixers may be useful when using a fine bubble aeration device. Although fine bubble aeration is very efficient in transferring oxygen to the liquid contents, they lack in their ability to mix a settled sludge blanket. The mixers 53, 54 would be energized just before the aeration blower is energized.

During normal operation of a two tank SBR, in accordance with the invention, the level in the tank being filled is allowed to obtain a predetermined height before a diverter valves 44, 44a transfers the influent to a second tank that has been previously decanted and is at its low level. On a single tank SBR, or an underloaded two tank SBR, it is often desirable to start the aeration cycle based on time and not on level. This decant device will operate at any level above the low water line with equal efficiency since it does not rely on a siphon that requires a balance in the hydraulic trap to start the siphon. If this balance is not established due to the hydraulic pressure associated with the liquid level in the tank, the flow will be by gravity only when the air is released from the bell of the siphon, therefore the flow is substantially below the siphon flow rate and may not be adequate to decant the liquid in the time allowed for the decant cycle.

Because the decanter lip or inlet is always below the liquid level in the tank, it is not affected by freezing or any ice build up at the surface of the tank if operated in very cold climates. It also prevents floating scum from being discharged with the effluent and affecting its quality.

Tests have shown that any MLSS settled in the space between the trough and the deflection baffle will be resuspended when the next aeration cycle is started, due to the air that is allowed to collect under the trough and be expelled through numerous air relief holes located in the space between the trough and deflector of the inventive device.

Dye tests and specially treated sawdust used to simulate activated sludge, have been used to verify that even with the sludge blanket just at the bottom of the decanter, the low inlet velocity and the deflectors do not allow the sludge blanket to be disturbed.

It is often desirable to use an SBR for nitrate reduction prior to discharging. Nitrate reducing bacteria thrive in an anoxic atmosphere such as is present after decanting and before aeration. This type of bacteria must have a carbon source to metabolize the nitrates which are a product of converting ammonia during the aeration cycle. The carbon source is present in the influent to the tank during the anoxic (lack of oxygen) fill period. However this carbon source must be put in close contact with the nitrifying bacteria. The least expensive way to accomplish this is to energize the low horsepower submerged mixer during the fill cycle. Since one of the products of nitrate conversion is oxygen, the total treatment process is improved as the oxygen is used by the existing aerobic bacteria to continue to reduce carbon an the associated BOD (biological oxygen demand). The BOD in the effluent is one of the parameters used for determining the efficiency of the treatment system. A well operated two tank SBR treating domestic waste should be able to obtain an effluent with a BOD less than 10 mg/l; SS suspended solids less than 10 mg/l; ammonia than 0.5 mg/l; and total nitrogen of less than 10 mg/l. This effluent quality will meet most EPA discharge requirements without the expense of tertiary filters or advanced waste treatment schemes.

Figure 6:
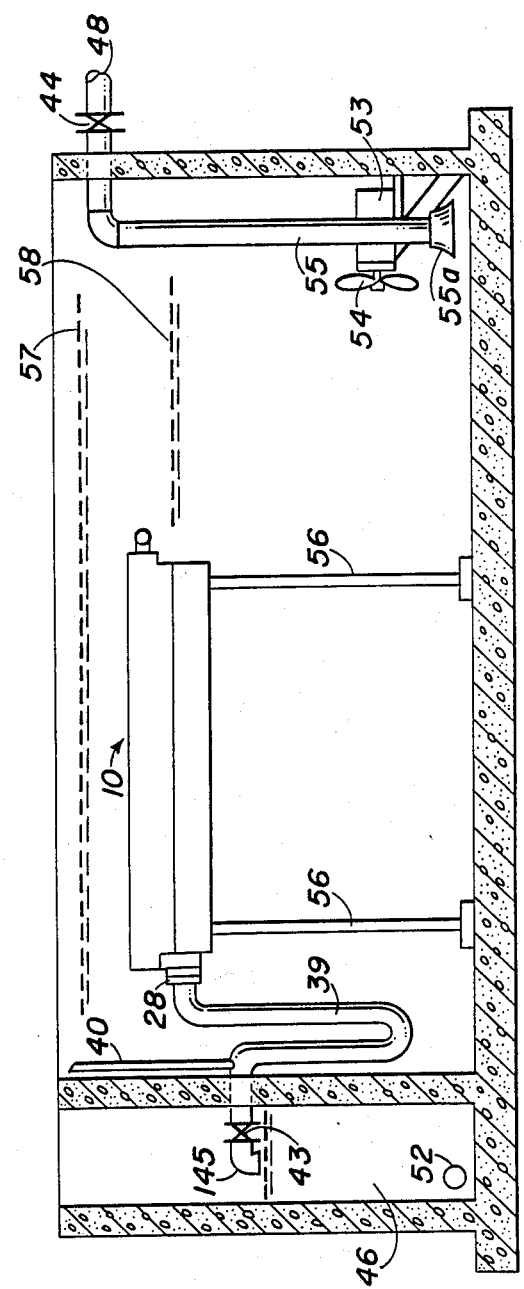
FIG. 6 is a cross section taken along the line 6—6 of FIG. 5.

FIG. 6 illustrates a support system 56 for maintaining the elevation of the fixed decanter 10 and secure it to the floor of tank 49, 50. The support system must be adequate to resist the upward buoyancy of the decanter when submerged below the high water level 57. An influent pipe 55 extends to near the bottom of the tank floor. A discharge bell 55a is used, with a diameter that is two times the diameter of the influent pipe 55. The distance between the floor and bell 55a should be approximately one-half the diameter of the bell 55a. The floor is used as a reactor wall and spreads the influent over the floor at relatively low velocity. In a one tank SBR system, influent is introduced into the tank during the decant cycle. It is imperative that high strength waste be introduced into the lower portion of the sludge blanket which will allow the soluble BOD content of the waste to be absorbed in the bacteria before the liquid can reach the decanter. The solids in this influent are held from rising through the sludge blanket by their higher density. This is only true if the velocity of the influent is dissipated before it can disturb the delicate balance of the fluffy type of sludge that is typical for an activated sludge treatment system.

Figure 7:
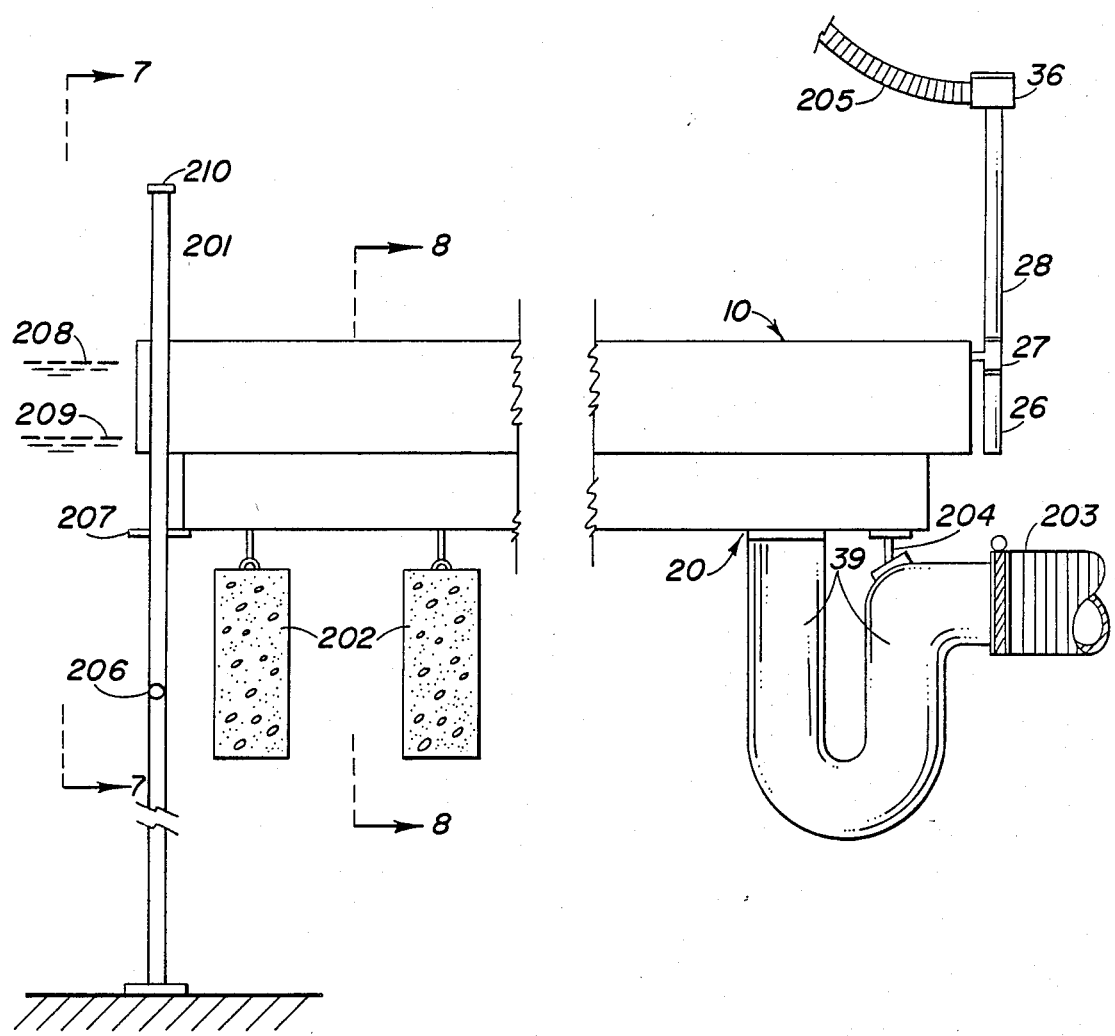
FIG. 7 is a side elevational view illustrating a floating decanter according to a further embodiment of the invention.
Figure 8:
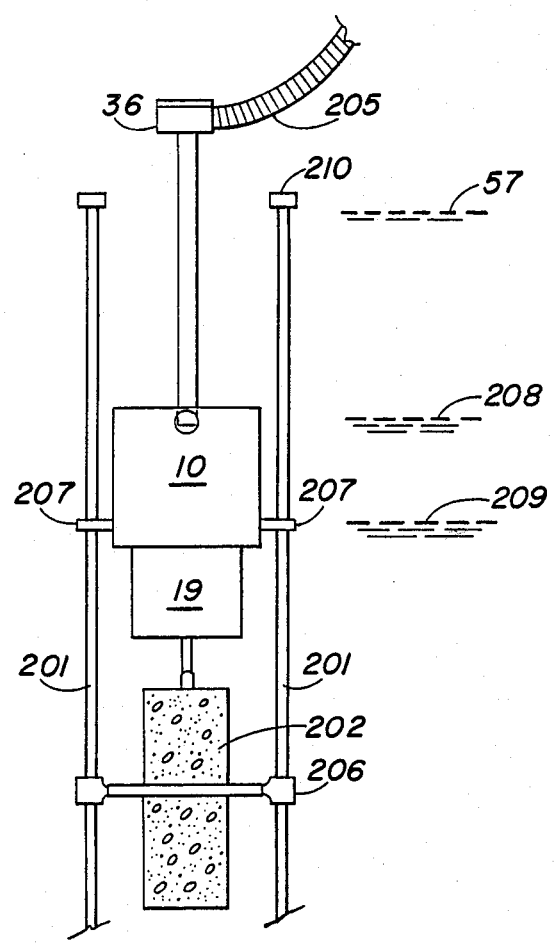
FIG. 8 is an elevational view of the decanter of FIG. 7 taken along the line 7—7 of FIG. 7.

Referring to FIG. 7, the floating decanter 10 is shown mounted in the SBR tank. A single set of guide rails 201 are provided to retain the decanter 10. Additional rails 201 have been omitted for clarity. The number required is determined by the length of the decanter. Ballast blocks 202, are shown suspended from the decanter, and particularly from the trough 19. To overcome the buoyancy of the trough when it is empty of water, the trap 39 will always contain water. The depth of the trap will be greater than the required air pressure in the hood 11. A flexible connector 203 is connected to the outlet 42. The trap is kept rigid with a support 204 connected to the bottom of the trough 19. The vent and air supply piping 28 terminates in a water and airtight box. Wiring and air supply is contained in the airtight flex connector 205 which extends to the air supply and vent system as shown in FIG. 3.

Figure 9:
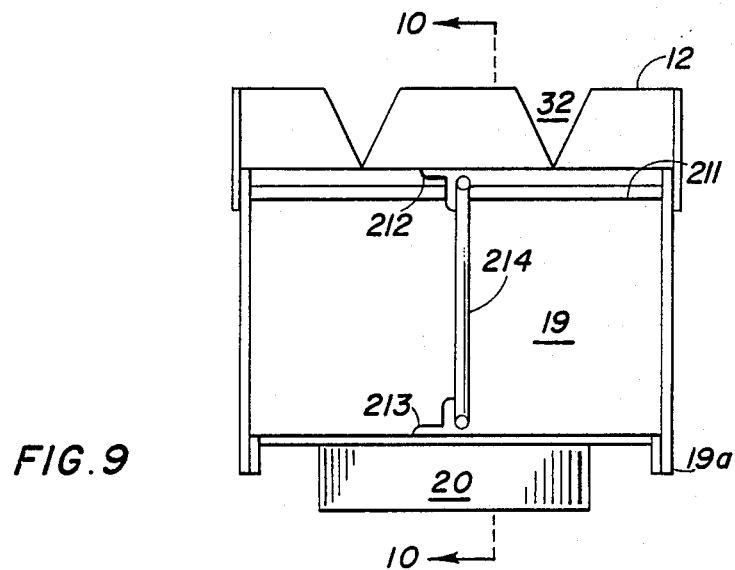
FIG. 9 is an elevation of the trough only of FIG. 7 taken along the line 8—8 of FIG. 7 to show the support system.
Figure 10:
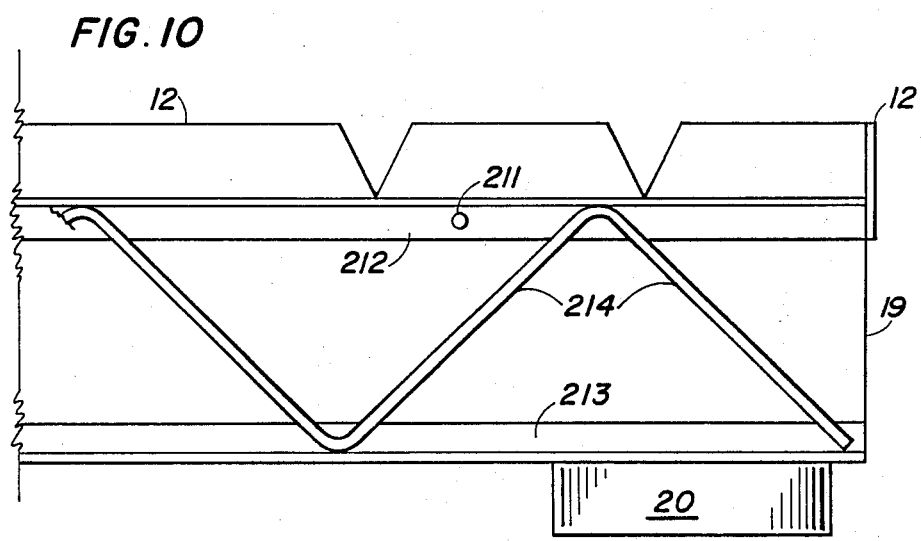
FIG. 10 is a partial elevation view of the trough of FIG. 7 taken along the line 9—9 of FIG. 9, which illustrates in particular a bar joist that provides rigidity to the floating decanter without external support system.

A cross brace is provided between the vertical supports 201. The cross brace prevents the decanter from lowering below the low water line established in the SBR tank. Plates 210 on the top of the supports 201 limit the vertical travel of the decanter 10 and will match the high water line in the tank of the SBR. Water line 208 represents the position of the decanter when it is in operation and liquid is being drawn from the decanter. Water line 209 is the relative location of the decanter when the decanter is not being operated. This prevents solids and liquid from entering the decanter when filling or aerating the tank contents. The guides 207 shall communicate with the trough 19 and shall keep the decanter in a restricted area without binding and allow the decanter to float near the top of the tank level. Structural strength is enhanced to the sides of trough 19 with the use of spacer 212. The number and size is determined by the length of the trough 19 and the cross sectional area of the trough. The trough may contain an integral bar joist which is located on the center line of the trough and extending longitudinally the length of the trough. The top cord of this joist is shown as 212, whereas the bottom cord is shown as 213 in FIGS. 9 and 10. The bent bar of the joist 214 is welded to 212 and 213. The bottom of this joist cord 213 is tack welded to the bottom of trough 19. The use of this integral support system allows the decanter to be used in the floating mode without deflection. In the fixed decanter mode, this arrangement allows the decanter to be supported from the ends without deflection of the trough or weir to assure an even flow of liquid to be decanted over the entire length.

Operation of the floating decanter is controlled from the conductive probes 25 and 25a (see FIG. 2). When the decanter is out of service, probe 25 operates solenoid 3a to pressurize the hood and raise the decanter to a level 209. This prevents liquid from overflowing the weir opening 32. This level places the lip of the hood 11 just below the water level 209. The decanter remains buoyant and rises with the rising level in the SBR tank. When a decant cycle is desired to start, solenoid valve 5 is opened until conductive probe 25a is grounded. This closes the solenoid valve 33 and prevents the decanter from lowering deeper into the tank water level. Note the vent leg 31 is always above the high water line 57 and vents to atmosphere.

After the decant cycle is completed, solenoid valve 34 is opened to repressurize the hood 11 from air source 37 until the probe 25 is exposed. Valve 34 is then closed and maintains the decanter at a level that will not allow liquid to go over weir 12 and opening 32. It will also prevent solids and liquid from entering the decanter during the fill and aeration cycles of the SBR treatment process. All other aspects of the invention remain in effect whether the decanter is a fixed typed (sub-surface) or floating.

It has become apparent through testing of the inventive decanter apparatus that is works in theory and in practice, and that it is a step forward in advancing the art of waste treatment, and in so doing help to protect the environment in which we all live.

While a specific embodiment of the invention has been showed and described in detail to illustrate the application of the principles of the invention, it will be understood that the invention may be embodied otherwise without departing from such principles.

I claim:

1. A method of decanting liquid from a tank receiving liquid and solids for settling out of the solids from the liquid, comprising:
   fixing a trough having an open top in the tank and surrounding the open top with a weir;
   covering the open top with an air tight hood having a lower edge extending outwardly of and below the open top of the trough;
   supplying liquid into the tank up to a level above the open top of the trough;
   controlling both the supply and the discharge of air to the interior of the hood by vent control means for maintaining the level of liquid in the hood to be just above the open top of the trough for permitting liquid to flow over the open top of the weir into the trough; and
   discharging liquid into a liquid trap into an effluent outlet connected to the trough at a level below the lower edge of the hood to prevent siphoning through said effluent outlet.

2. A method according to claim 1 wherein the liquid has scum thereon, the method including providing the hood with a concave top and a level weir edge around the concave top, and controlling a level of liquid in the tank to be just above the weir edge of the hood for discharging scum on the liquid in the tank into the concave top.

3. A method according to claim 2, including discharging scum from the concave top of the hood.

4. A method according to claim 1 including deflecting the flow of liquid before it reaches the open top of the trough to flow at least partly horizontally into the trough.

5. A method according to claim 4 including deflecting the flow of liquid so that it flows diagonally away from the open top of the trough before it is deflected toward the open top of the trough.

6. A method according to claim 4 including directing gases that may be trapped under the trough into a space between the exterior of the trough and the interior of the hood.

7. A decanter apparatus for removal of settled and clarified liquid from a mixture of liquid and solids which rises to a high liquid level, comprising:
   a trough having an open top which is surrounded by a weir at a first level and having a closed bottom, the weir mounted along the top of the trough;
   an air tight hood having an interior and an exterior, and being positioned over said trough, said hood being spaced outwardly of said weir and having a lower edge extending below said weir at a second level;
   an effluent outlet connected to said trough at a second level below said first level for discharging effluent liquid from said trough;
   liquid trap means in said effluent outlet for receiving discharged liquid while preventing siphoning through said effluent outlet;
   an air vent connected to the interior of said hood above said weir and extending from the second level at the lower edge of said hood on an exterior of said hood to a level above the high liquid level in said decanter apparatus;
   an equalizing vent having a lower end extending to the first level of said weir on the exterior of said hood; and
   vent control means connected to said air vent and said equalizing vent for supplying and discharging air to and from said air and equalizing vents for controlling a level of liquid between said hood and said trough to regulate the flow of liquid over said weir.

8. An apparatus according to claim 7 including a deflector plate connected to and spaced outwardly from an exterior of said trough below the lower edge of said hood, said deflector plate having an upper edge vertically aligned with an outer effective edge of said hood whereby any solids in liquid flowing into the space between said trough and said hood tend to fall downwardly through the space between said deflector plate and said trough, and any gases trapped under said trough tend to flow upwardly in the space between said deflector plate and said trough.

9. An apparatus according to claim 8 wherein said deflector plate includes an upper angle portion extending upwardly at an angle of from about 45° to about 60° to the horizontal and in a direction outwardly from said trough.

10. An apparatus according to claim 9 including an angle plate connected to the exterior of said hood adjacent the lower edge of said hood for defining the outer effective edge of said hood and for stiffening the lower edge of said hood.

11. An apparatus according to claim 9 including a plurality of spacers connected between said deflector plate and a lower portion of said trough, and a plurality of spacers connected between said trough and said hood.

12. An apparatus according to claim 11 wherein said trough has a floor, said lower portion of said trough comprising a flange around said floor, and holes extending through said flange for permitting trapped air under said floor to escape into the space between said deflector plate and said trough.

13. An apparatus according to claim 7 wherein said hood has a downwardly concave top, and a periphery and a scum outlet connected to said hood and communicating with an interior of said concave top for discharging any scum from said concave top.

14. An apparatus according to claim 13 wherein said hood includes a weir edge around the periphery of said concave top for defining a further weir over which liquid flows into said concave top, said further weir being horizontal and level.

15. An apparatus according to claim 7 wherein said vent control means comprises a pressurized air valve connected to said air vent for supplying pressurized air to said air vent, an equalizing valve connected between said air vent and said equalizing vent for communication of air between said air vent and said equalizing vent for moving a level of liquid in said hood to the first level of said weir, and a probe connected in said air vent for sensing liquid at the second level of the lower edge of said hood.

16. An apparatus according to claim 7 wherein said liquid trap means comprises a downwardly bent U-shaped trap in said effluent outlet, said trap having a discharge end, an outlet valve connected to said discharge end of said trap and an atmosphere vent connected to said discharge end of said trap for communicating air from said discharge end of said trap to the atmosphere.

17. An apparatus according to claim 7 including a tank for receiving liquid between a high water and a low water level, said trough being in said tank at a position near and below said low water level, means for fixing said trough in said tank, said effluent outlet being connected through a wall of said tank to the exterior of said tank, an influent pipe connected to said tank for discharging liquid containing solids in said tank near the bottom thereof, said vent control means being substantially positioned above said high water level.

18. An apparatus according to claim 7 wherein the open top of said trough has a periphery and said weir extends around the entire periphery of the open top of said trough, said hood being spaced outwardly around all of said weir.

19. An apparatus according to claim 18 including a plurality of openings in an upper edge of said weir.

20. An apparatus according to claim 19 wherein said openings are V-shaped.

* * * * *